(12) United States Patent
Hanawa et al.

(10) Patent No.: US 6,282,505 B1
(45) Date of Patent: Aug. 28, 2001

(54) MULTI-PORT MEMORY AND A DATA PROCESSOR ACCESSING THE SAME

(75) Inventors: Makoto Hanawa, Niiza; Kenji Kaneko, Sagamihara; Kazumichi Yamamoto, Hachioji; Kentaro Shimada, Kawasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/125,285

(22) PCT Filed: Feb. 16, 1996

(86) PCT No.: PCT/JP96/00338

§ 371 Date: Aug. 14, 1998

§ 102(e) Date: Aug. 14, 1998

(87) PCT Pub. No.: WO97/30395

PCT Pub. Date: Aug. 21, 1997

(51) Int. Cl.[7] .......................................... G11C 8/00
(52) U.S. Cl. ................. 703/25; 710/1; 711/149; 365/185.11; 365/189.02; 365/230.02
(58) Field of Search .................... 703/24, 25, 26; 711/149, 167, 122, 128; 365/203, 233, 189.04, 230.03, 230.05, 185.11, 189.02; 710/1

(56) References Cited

U.S. PATENT DOCUMENTS

| | | | |
|---|---|---|---|
| 5,542,067 | * 7/1996 | Chappell et al. | 395/494 |
| 5,875,470 | * 2/1999 | Dreibelbis et al. | 711/147 |
| 5,968,160 | * 10/1999 | Saito et al. | 712/14 |
| 6,023,745 | * 2/2000 | Lu | 711/5 |

\* cited by examiner

Primary Examiner—Kevin J. Teska
Assistant Examiner—Thai Phan
(74) Attorney, Agent, or Firm—Antonelli, Terry, Stout & Kraus, LLP

(57) ABSTRACT

In a cache memory of a super-scalar or VLIW processor to concurrently process a plurality of memory accesses, to provide a memory capable of multi-port access operation, there is provided a unit which subdivides the cache memory into a plurality of memory banks for concurrent operations thereof and which allocates memory ports independently to the respective memory banks. In a first cycle, the first and second memory ports are allocated to the first and second memory banks, respectively. If a hit occurs, the plural accesses are completed in one cycle. If a miss results, the first and second memory ports are allocated respectively to the second and first memory banks in a second cycle.

10 Claims, 6 Drawing Sheets

MULTI-PORT MEMORY AND A DATA PROCESSOR ACCESSING THE SAME

TECHNICAL FIELD

The present invention relates to a cache memory to increase the data access speed in a computers and data processors, and in particular, to a cache memory suitable for a super-scalar processor or a very long instruction word processor (to be referred to as a VLIW processor herebelow) capable of executing a plurality of memory access operations during one cycle.

BACKGROUND ART

When a super-scalar processor and/or a VLIW processor is employed in a computer or a data processor, a plurality of memory accesses during one cycle depending on cases. To conduct a plurality of memory access operations during one cycle, it is necessary to use memory ports as many as there are memory accesses during one cycle. A conventional example of a dual-port memory capable of conducting a plurality of memory accesses during one memory cycle has been described in pages 168 to 170 of an article "Power and PowerPC" published from Morgan Kaufmann Publishers, Inc. in 1994.

In accordance with a first method, there is used a memory including memory cells which can be accessed via two ports. For one memory cell in which information of one bit is stored, there are disposed two sets of address decoders, two sets of word lines, two sets of data bit lines, and two sets of sense amplifiers. This leads to a memory which can be accessed via two ports. The first method requires two sets of work lines and data bit lines. When compared with the single-port configuration, the memory cell area is doubled to implement the memory having the same memory capacity.

In a second method, the conventional single-port memory is disposed in a duplicated constitution to implement a memory which can be accessed via two ports. When compared with the dual-port memory of the first embodiment, this memory differs in that the memory cells are also duplicated. Consequently, to write data in the memory, the same data is required to be written in both memory areas at the same address. Since the memory cells are duplicated in the second method, the capacity of the necessary memory cells is two times that of the inherent memory. In other words, only one half of the actual memory cells can be used to store independent data. Namely, for the same memory capacity, the area of memory cells is doubled when compared with the prior art.

Between the first method and the second method, there exists only quite a small difference in the memory cell area. Additionally, in the first method using the memory cells in a shared manner, when the memories are accessed at the same address via two ports, one of the accesses is set to a wait state and hence the access time inevitably becomes doubled.

In a third method, the memory is subdivided into two memory banks in accordance with addresses. In an operation to access two memory banks, the accesses are simultaneously processed. Data at an address exists only in either one of the memory banks. Consequently, when compared with the dual-port memory, there is required a selector for each of an address input section and a data output section to establish a correspondence between the memory ports and the memory banks. In this connection, the lower-most bit of the accessing address is used to indicate the selection for the selector.

Since the memory cells are not duplicated in the third method, the capacity of memory cells indicates the inherent memory capacity. When compared with the second method, the memory capacity is doubled with the same number of memory cells. However, the memory bank to be accessed is determined by one bit of the address in the third method, the total memory access time includes, in addition to the memory access time, the selection time of the selector. In consequence, there is a fear of elongation of the total memory access time when compared with the second method.

In a fourth method, one single-port memory is used in a time-shared fashion. One cycle is subdivided into two sections in which a first-half cycle is used for an access via a first memory port and a second-half cycle is utilized for an access via a second memory port to thereby implement a dual-port memory.

Since the memory cells and the like are not duplicated in the fourth method, the capacity of memory cells directly indicates the inherent memory capacity like in the third method. However, to execute two memory access operations during one cycle, the memory access operation is required to be increased, i.e., the memory cell access time is required to be reduced to half that of the original access time. Conversely, when the memory cell access time is used as the reference (when the access time is kept unchanged), the total cycle time is to be doubled to achieve two memory access operations during one cycle.

The conventional multi-port memory described above is attended with the following problems. When the memory cell area is kept retained, the memory capacity is lowered to half that of memory cells or the memory access time becomes longer. Alternatively, when the memory cell access time is used as the criterion, the total cycle time is to be doubled.

It is therefore an object of the present invention, which solves the problems above, to provide a multi-port memory in which the memory capacity is substantially equal to that of memory cells in the single-port memory and a plurality of memory access operations can be simultaneously executed substantially without elongating the memory access time, without causing a bank access collision, and without increasing the total cycle time.

DISCLOSURE OF INVENTION

In accordance with the present invention, there is provided a multi-port memory subdivided into a plurality of memory banks, each memory banks including means for storing therein data and an address of the data in a pair, determining means for determining whether or not an address corresponding to an address inputted from an external device exists in the memory bank, and means for accessing and outputting data paired with the address to an external device. The memory comprises first means for selecting each of a plurality of addresses inputted from the plural memory ports and inputting the selected address to either one of the plural memory banks and means for outputting data read from each of the memory banks to a data output port corresponding to the memory port from which the address inputted to the memory bank is supplied.

Moreover, In the multi-port memory above, the first means inputs, in a first cycle, a first address supplied from a first memory port of the plural memory ports to a first memory bank of the plural memory ports and a second address supplied from a second memory port of the plural memory ports to a second memory bank of the plural memory ports, the first means inputs, when the determining means of the first memory bank determines absence of data to be paired with the first address, the first address to the second memory bank in a cycle after the first cycle, and the first means inputs, when the determining means of the second memory bank determines absence of data to be paired with the second address, the second address to the first memory bank in a cycle after the first cycle.

Moreover, in the multi-port memory described above, the first means inputs, in a first cycle, a first address supplied from a first memory port of the plural memory ports to all memory banks of the plural memory ports.

Next, there is provided a data processor connected for use to the multi-port memory, the memory being used as a data memory. The processor comprises means for decoding information of a predetermined number of bits arranged in an instruction of accessing the data memory, the instruction being selected from instructions of a control program of the data processor, and means for executing the instruction in accordance with a result of the decoding. The information is information specifying one of the plural memory ports to be accessed.

The multi-port memory operates as follows.

An address from the first memory port is inputted to the first memory bank in the first cycle and then a check is conducted to determine whether or not data to be accessed has been stored in the first memory bank. If the data exists therein, the data is accessed to thereby finish processing on the first memory port side. If the data is missing, the address is inputted to the second memory bank in the second cycle and then a check is conducted to determine whether or not data to be accessed has been stored in the second memory bank. If the data exists therein, the data is accessed to thereby finish the processing of the first memory port.

On the other hand, an address is inputted via the second memory port in the first cycle to a memory bank other than the first memory bank such that a check is made to determine whether or not data to be accessed has been stored therein. If this is the case, the data is accessed to thereby finish the processing of the second memory port. If the data is missing, an address is inputted to a memory bank other than the second memory bank in the second cycle such that a check is made to determine whether or not data to be accessed has been stored therein. If the data exists therein, the data is accessed to thereby finish the processing of the second memory port.

Incidentally, in first cycle of the operation above, since the first memory port accesses the first memory bank while the second memory port accesses a memory bank other than the first memory bank, there is prevented the access collision and hence both operations can be simultaneously, i.e., concurrently processed.

Additionally, in second cycle, since the first memory port accesses the second memory bank while the second memory port is accessing a memory bank other than the second memory bank, there is prevented the access collision also in this case and hence both operations can be concurrently processed.

Furthermore, when there is issued only one memory access, the memory access can be completed in one cycle by accessing all memory banks in the first cycle. That is, an address of the first memory port is inputted to all memory banks in the first cycle and a check is made to determined one of the memory banks in which the data to be accessed has been stored. When the data exists in either one of the memory banks, the data is accessed to thereby terminate the processing of the first memory port.

Moreover, in a data processor connected to the multi-port memory above as its data memory, when bit information is appropriately specified in an instruction to access the data memory, it is possible during the first cycle to access the memory bank in which the access data is stored. This makes it possible to conduct a plurality of memory accesses during one cycle.

BEST MODE FOR CARRYING OUT THE INVENTION

Figure 1:
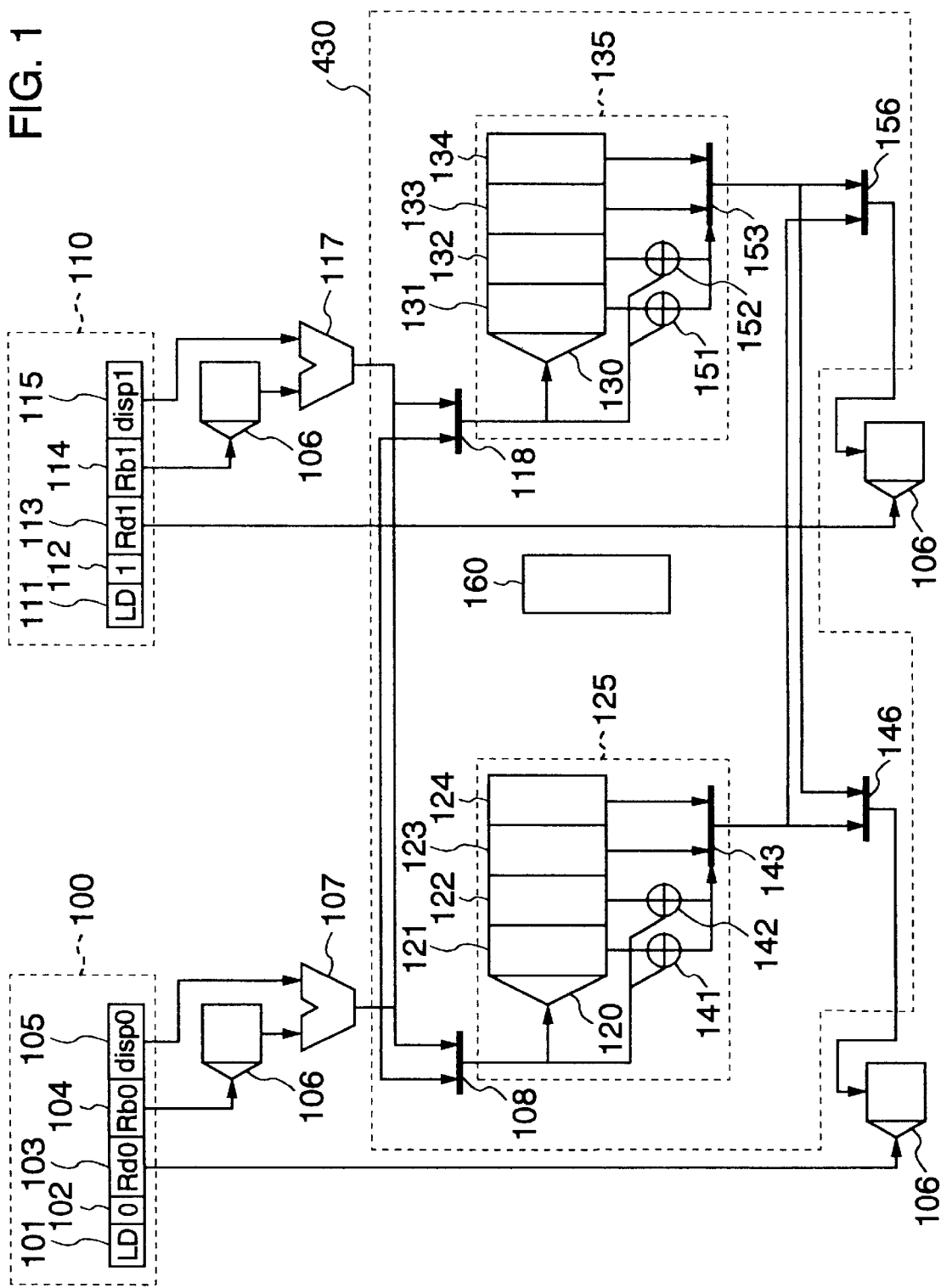
FIG. 1 is a block diagram showing a cache memory and a peripheral block thereof in an embodiment in accordance with the present invention.

Referring now to the drawings, description will be given of embodiments in accordance with the present invention.

Figure 5:
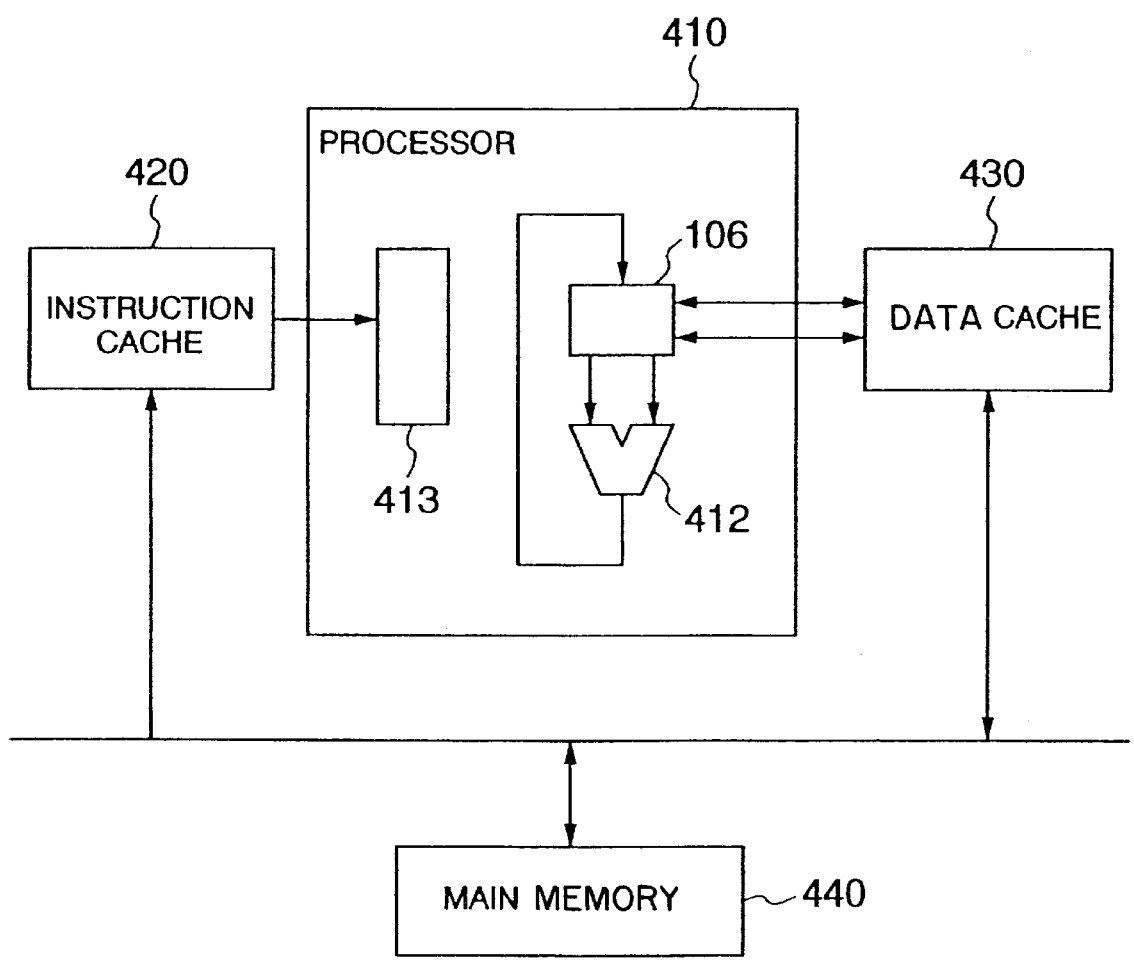
FIG. 5 is a block diagram entirely showing a data processor connected to the cache memory shown in FIG. 1.

FIG. 5 shows in a block diagram a data processor in an embodiment of the present invention. The data processor of the embodiment includes a processor 410 to execute instructions, an instruction cache 420 as a cache memory for instructions, a data cache 430 as a cache memory for data, and a main memory 440. These components are connected to each other via address and data buses. The instruction cache 420 is used to keep copies of program areas of the main memory 440 and the data cache 430 is employed to keep copies of data areas of the main memory 440.

The processor 410 includes a register file 106 to store data, an arithmetic unit 412 to execute operations in accordance with instructions, and a control circuit 413 to control these elements. The processor 410 reads an instruction as a processing unit of a program from the instruction cache 420 and then the control circuit 413 drives in accordance with indication of the instruction the circuits such as the register file and the arithmetic unit in the processor 410.

There are provided the following kinds of instructions such as an instruction in which data in the register file 106 is operated by the arithmetic unit 412 or the like and a result of the operation is stored in the register file 106. In addition, there are supported an instruction to write the contents of the register file 106 in the data cache 430 and an instruction to write the contents of the main memory 440 or the data cache 430 in the register file 106.

In this configuration, the data cache 430 is a cache memory having two memory ports. When data to be accessed exists in the data cache 430, two data accesses can be simultaneously accomplished. Data read as an access result from the data cache 430 is sent to the processor 410 via a signal line (a bus line or the like) which establishes a connection between the data cache 430 and the processor 410. FIG. 1 shows in detail a partial configuration of the data cache 430.

FIG. 1 includes an internal block configuration of instruction registers 100 and 110, a register file 106, address calculators 107 and 117 of the processor 410 and the data cache 430 (enclosed with broken lines).

In each of the instruction registers 100 and 110, there is set an instruction for a memory access. The instructions set to the registers 100 and 110 are respectively subdivided into five sections. The five sections respectively include operation code fields 101 and 111 to stipulate types of operation, port specifying hint fields 102 and 112 indicating information for specifications of access ports to the data cache, destination register specification fields 103 and 113, base address register specification fields 104 and 114, and displacement specification fields 105 and 115. Thanks to the constitution, the processor 410 can simultaneously execute two instructions.

Assume that an instruction "Load (LD)" to transfer data from a memory to a register has been set to the instruction register 100 in FIG. 1. The Load instruction can be determined by interpreting the operation code field 101 by a decoder or the like, not shown. When the instruction is executed, data of a register Rb0 specified by the base address register specification field 104 is read from the register file 106, the value of the data is added to displacement disp0 in the displacement specification field 105, the memory is accessed with the result of addition as an access key to read data therefrom, and then the obtained data is stored in a register Rd0 of the register file 106, the register Rd0 being specified by the destination register specification field 103.

Moreover, it is assumed that the "Load (LD)" instruction to transfer data from the memory to a register has been similarly set to the instruction register 110 of FIG. 1. This instruction can also be determined by interpreting the operation code field 111 by a decoder or the like, not shown. When the instruction is executed, data of a register Rb1 specified by the base address register specification field 114 is similarly read from the register file 106, the value of the data is added to displacement disp1 in the displacement specification field 115, the memory is accessed with the result of addition as an access key to read data therefrom, and then the obtained data is stored in a register Rd1 of the register file 106, the register Rd1 being specified by the destination register specification field 113.

When the instruction in the instruction register 100 is executed, a memory port 0 of the data cache 430 is accessed, whereas when the instruction in the instruction register 110 is executed, a memory port 1 of the data cache 430 is accessed. Therefore, when the processor 410 executes two Load instructions at the same time, two accesses to the data cache are simultaneously issued via the signal lines between the processor 410 and the data cache 430. It is assumed that the signal can simultaneously transfer two access requests of two instructions.

The data cache 430 includes two memory banks 125 and 135, four selectors 108, 118, 146, and 156, and a control circuit 160 to control these components. The selector 108 conducts selection to determine whether an input address to the memory bank 0 (125) is to be inputted from a memory port 0 (which is a port for the memory bank 0 and comprehensively indicates an address input port and a memory data output port for the memory 0) or from a memory port 1 (which is a port for the memory bank 1 and comprehensively indicates an address input port and a memory data output port for the memory 1). The selector 118 conducts selection to determine whether an input address to the memory bank 1 (135) is to be inputted from the memory port 0 or from the memory port 1. The selector 146 conducts selection to determine whether read data to be outputted to the memory port 0 is to be supplied from the memory bank 0 (125) or from the memory port 1 (135). The selector 156 conducts selection to determine whether read data to be outputted to the memory port 1 is to be fed from the memory bank 0 (125) or from the memory port 1 (135).

The memory bank 0 (125) is a cache memory of a two-way set-associative operation. Read operations of memory arrays 121 to 124 are carried out by decoding low-order bits of the address selected by the selector 108. In the memory arrays 121 and 122, there are stored tags of ways 0 and 1, respectively. Data of way 0 and that of way 1 are respectively stored in the memory arrays 123 and 124. The tags of way 0 and way 1 respectively read from the memory arrays 121 and 122 are respectively compared by comparators 141 and 142 with high-order bits of the address selected by the selector 108. In a state in which it is determined as a result of comparisons that there exists a matching address, namely, in a hit, data corresponding to the matching way is selected by a selector 143 from the data of way 0 and data of way 1 respectively read from the memory arrays 123 and 124, and the selected data is delivered as output data from the memory bank 0 (125). A state in which the matching address is not found is called a miss.

The memory bank 1 (135) is, like the memory bank 125 above, a cache memory of a two-way set-associative operation. Read operations of memory arrays 131 to 124 are carried out by decoding low-order bits of the address selected by the selector 118. In the memory arrays 131 and 132, there are stored tags of ways 0 and 1, respectively. Data of way 0 and that of way 1 are respectively stored in the memory arrays 133 and 134. The tags of way 0 and way 1 respectively read from the memory arrays 131 and 132 are respectively compared by comparators 151 and 152 with high-order bits of the address selected by the selector 118. In a state in which it is determined as a result of comparisons that there exists a matching address, namely, in a hit, data corresponding to the matching way is selected by a selector 153 from the data of way 0 and data of way 1 respectively read from the memory arrays 133 and 134 and the selected data is delivered as output data from the memory bank 1 (135). A state in which the matching address is not found is called a miss.

The selectors 146 and 156 conduct operations such that the data outputted from each of the respective memory banks is outputted to the memory port 0 when the read input address is received from the memory port 0 and to the memory port 1 when the read input address is from the memory port 1. Thereafter, the read data outputted from the selector 146 is stored in a register of the register file specified by the destination register specification field Rd0 (103) of the instruction register 100. Additionally, the read data outputted from the selector 15 is stored in a register of the register file specified by the destination register specification field Rd1 (113) of the instruction register 100.

In this connection, although the selectors 143 and 153 respectively generating output data from the memory banks 0 (125) and 1 (135) and the selectors 146 and 156 respectively generating data to be respectively outputted to the memory port 0 and 1 are separately disposed in the configuration of the embodiment, it may also be possible to dispose two selectors each having four inputs and one output so as to implement a selector configuration achieving the same function of four selectors 143, 153, 146, and 156. Namely, assuming that data items read from the memory arrays 124, 124, 133, and 134 are used as inputs of four-input selectors, it is only necessary that there are arranged two four-input and one-output selectors such that an output from one of the selectors is delivered to the memory port 0 and the other one thereof is fed to the memory port 1. In this case, the indication of selection is required to be independently conducted for the 4-input selectors.

The operation accomplished in the data cache 430 is controlled by the control circuit 160. In this connection, signal lines for the control circuit 160 to gather states of respective constituent elements of the data cache and signal lines for the control circuit 160 to control the elements are not shown in the diagram. Incidentally, an arrow line specifying the register file 106 from the destination register specification field Rd0 (103) of the instruction register 100 passes the inside of the data cache 430 in FIG. 1. However, this is only for simplicity of drawing, and it is not actually necessary that the line passes through the data cache 430. This is also the case with an arrow line specifying the register file 106 from the destination register specification field Rd1 (113) of the instruction register 110 passes the inside of the data cache 430 in the diagram.

Next, description will be given of operation of the data cache 430 by referring to FIGS. 2, 3, and 4.

Figure 2:
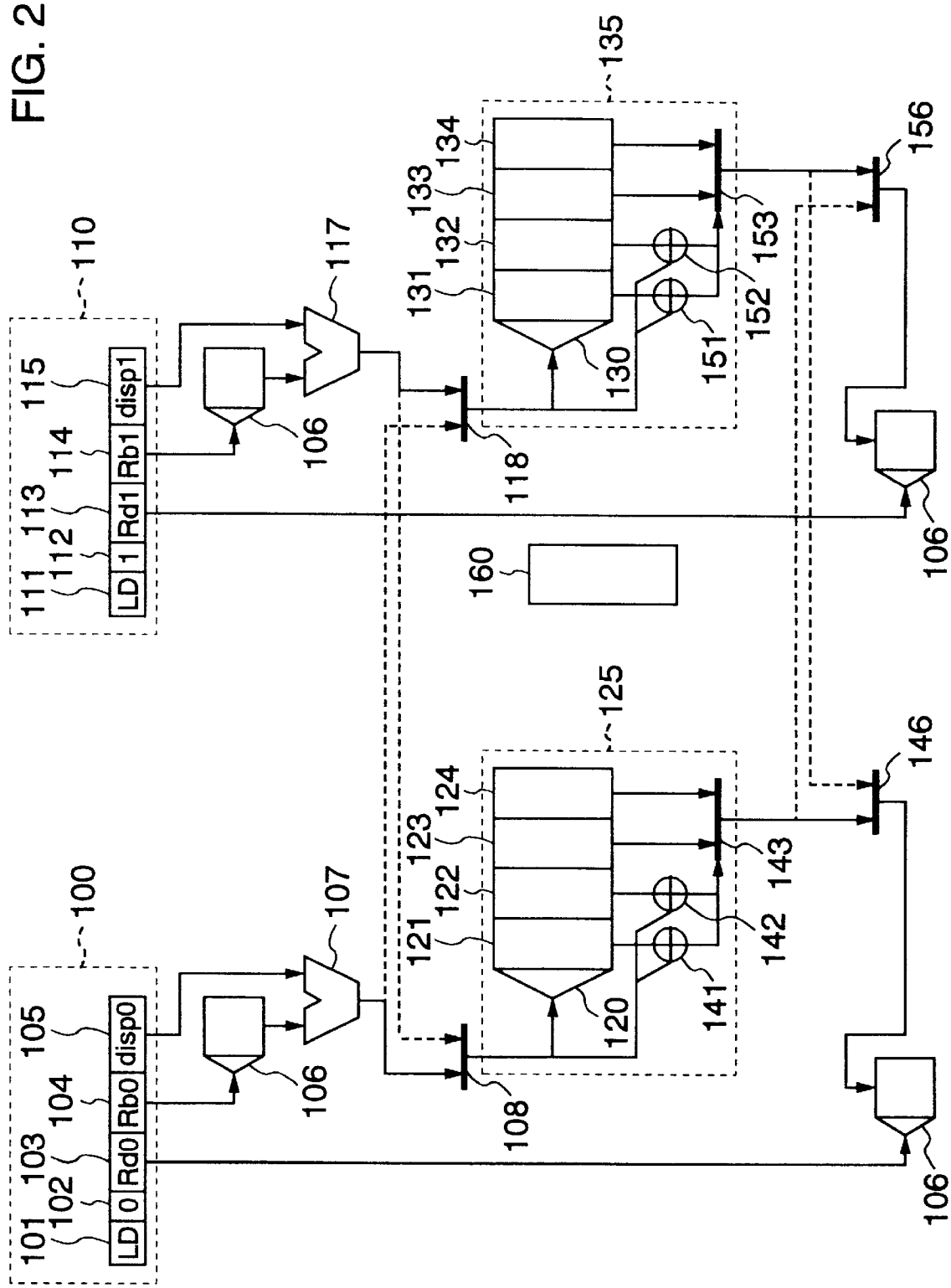
FIG. 2 is a diagram showing operation in a first cycle to simultaneously process two memory accesses in the cache memory shown in FIG. 1.
Figure 3:
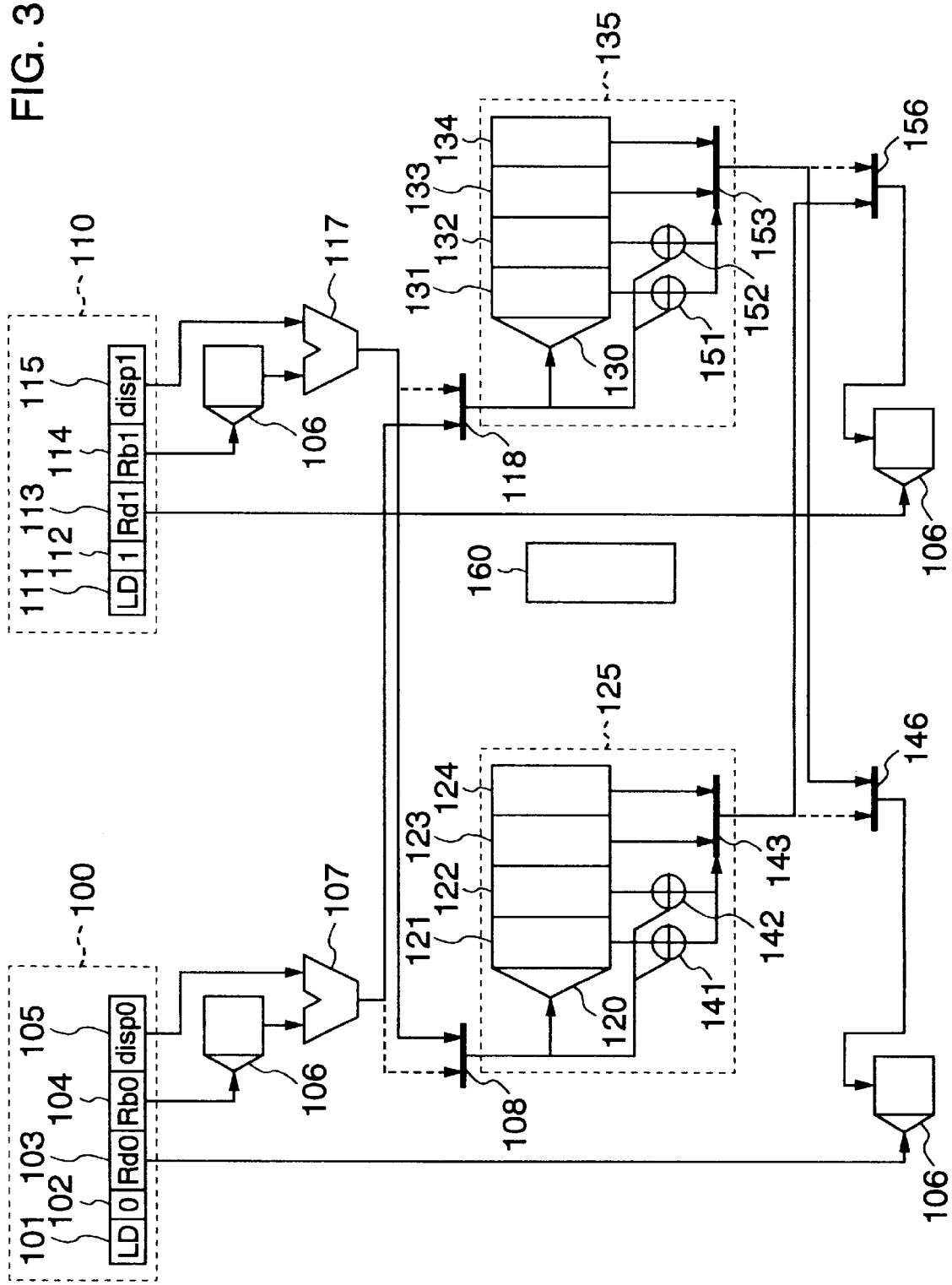
FIG. 3 is a diagram showing operation in a second cycle to simultaneously process two memory accesses in the cache memory shown in FIG. 1.

FIGS. 2 and 3 show operation to simultaneously process two Load instructions described in conjunction with FIG. 1. Operations respectively of the first and second cycles are shown in FIGS. 2 and 3, respectively. In this regard, the term "cycle" indicates timing to operate the data cache 430 and has a fixed relationship with the clock signal to operate the processor 410 and the system clock signal to drive the overall data processor. For example, one system clock signal corresponds to one cycle or a plurality of system clock signals correspond to one cycle.

In the first cycle, as can be seen from FIG. 2, the input address selector 108 of the memory bank 0 selects the side of memory port 0, namely, an access address of a Load instruction set to the instruction register 100. With the address, a search is conducted for the memory bank 0 (125) which is a cache memory of a two-way set-associative type. When a hit occurs with the address, the associated data is outputted from the selector 143. Through the selector 146, the data from the memory bank 0 (125) is outputted as read data on the memory port 0 side to thereby terminate the access on this side. If a miss occurs with the address, the operation of the first cycle is interrupted at the point and then the control circuit 160 determines that the memory bank 1 (135) is to be accessed in the second cycle.

On the other hand, as shown in FIG. 2, the input address selector 118 of the memory bank 1 selects the side of memory port 1, namely, an access address of a Load instruction set to the instruction register 110. With the address, a search is made for the memory bank 1 (135) which is a cache memory of a two-way set-associative type. When a hit occurs with the address, the associated data is outputted from the selector 153. Through the selector 156, the data from the memory bank 1 (135) is outputted as read data on the memory port 1 side of the data cache 430 to thereby terminate the access on this side. If a miss occurs with the address, the operation of the first cycle is interrupted at the point and then the control circuit 160 determines that the memory bank 0 (125) is to be accessed in the second cycle.

FIG. 3 shows operation in the second cycle when both of the accesses through the memory ports 0 and 1 result in a miss respectively in the memory banks 0 (125) and 1 (135). The second cycle is advanced in time with respect to the first cycle.

In the second cycle, the input address selector 108 of the memory bank 0 selects the side of memory port 1, i.e., an access address of a Load instruction set to the instruction register 110. With the address, a search is conducted for the memory bank 0 (125) which is a cache memory of a two-way set-associative type. When a hit occurs with the address, the corresponding data is outputted from the selector 143. Through the selector 146, the data from the memory bank 0 (125) is outputted as read data on the memory port 1 side to thereby terminate the access on this side. If a miss occurs with the address, the operation of the second cycle is interrupted at the point and then the control circuit 160 determines that the main memory 440 is to be accessed in the third cycle.

Similarly, the input address selector 118 of the memory bank 1 selects the side of memory port 0, namely, an access address of a Load instruction set to the instruction register 100. With the address, a search is made for the memory bank 1 (135) which is a cache memory of a two-way set-associative type. When a hit occurs with the address, the associated data is outputted from the selector 153. Through the selector 146, the data from the memory bank 1 (135) is outputted as read data on the memory port 0 side of the data cache 430 to thereby terminate the access on this side. If a miss occurs with the address, the operation of the second cycle is interrupted at the point and then the control circuit 160 determines that the main memory 440 is to be accessed in the third cycle or later.

In the embodiment described above, in the memory accesses, a search is conducted for both of the memory banks 0 (125) and 1 (135) which are cache memories of a two-way set-associative type to thereby determine the hit condition. In other words, the data cache 430 operates as a cache memory of a four-way set-associative type with a total cache capacity of both memory banks.

When two memory access instructions are simultaneously executed, the data cache 430 operates as a cache memory of a four-way set-associative type with a total cache capacity of both memory banks as described above. In this situation, when the access on the memory port 0 side results in a hit in the memory bank 0 (125) and the access on the memory port 1 side results in a hit in the memory bank 1 (135), two memory access instructions can be simultaneously executed during one cycle.

Consequently, for the simultaneous execution and termination of two memory accesses during one cycle, it is only necessary that an Load instruction having a high probability of the hit in the memory bank 0 (125) is executed to access the data cache 430 on the memory port 0 side and an Load instruction having a high probability, of the hit in the memory bank 1 (135) is executed to access the data cache 430 on the memory port 1 side. Such a control operation can be accomplished in accordance with information of the memory port specifying hint fields 102 and 112 of the Load instructions.

In the control circuit 413 of the processor 410, the system interprets the memory port specifying hint field of a memory access instruction, e.g., a Load instruction read from the main memory 440 or the main cache 420. If the memory port 0 is specified, the instruction is set to the instruction register 100; whereas, if the memory port 1 is specified, the instruction is set to the instruction 110. In the first cycle, the memory access instruction set to the register 100 accesses the memory bank 0 (125) and the memory access instruction set to the register 110 accesses the memory bank 1 (135). Consequently, the probability of occurrence of the hit is increased in the respective memory banks 125 and 135, which leads to a high probability of completion of two memory access instructions during one cycle.

For the setting of information to the memory port specifying hint fields 102 and 112 of the Load instructions, a compiler for the data processor having a processor including the data cache described above compiles the program in consideration of the structure of the data cache, the main memory accessing sequence in the program, and the utilization schedule of the data cache. Consequently, before the operation is executed, the information is already set to the memory port specifying hint fields 102 and 112 of the Load instructions. Due to the setting, it is possible during the execution of the program by the processor to lower the probability of simultaneous accessing to the same memory bank by the instructions respectively on the sides of the memory port 0 side and memory port 1.

In accordance with the embodiment described above, when two memory accesses are simultaneously executed, the cache operates as a cache memory conducting a four-way set-associative operation in two cycles. On the other hand, when only one memory access instruction is executed, the cache may be operated as a cache memory conducting a four-way set-associative operation in one cycle. FIG. 4 shows the operation.

Figure 4:
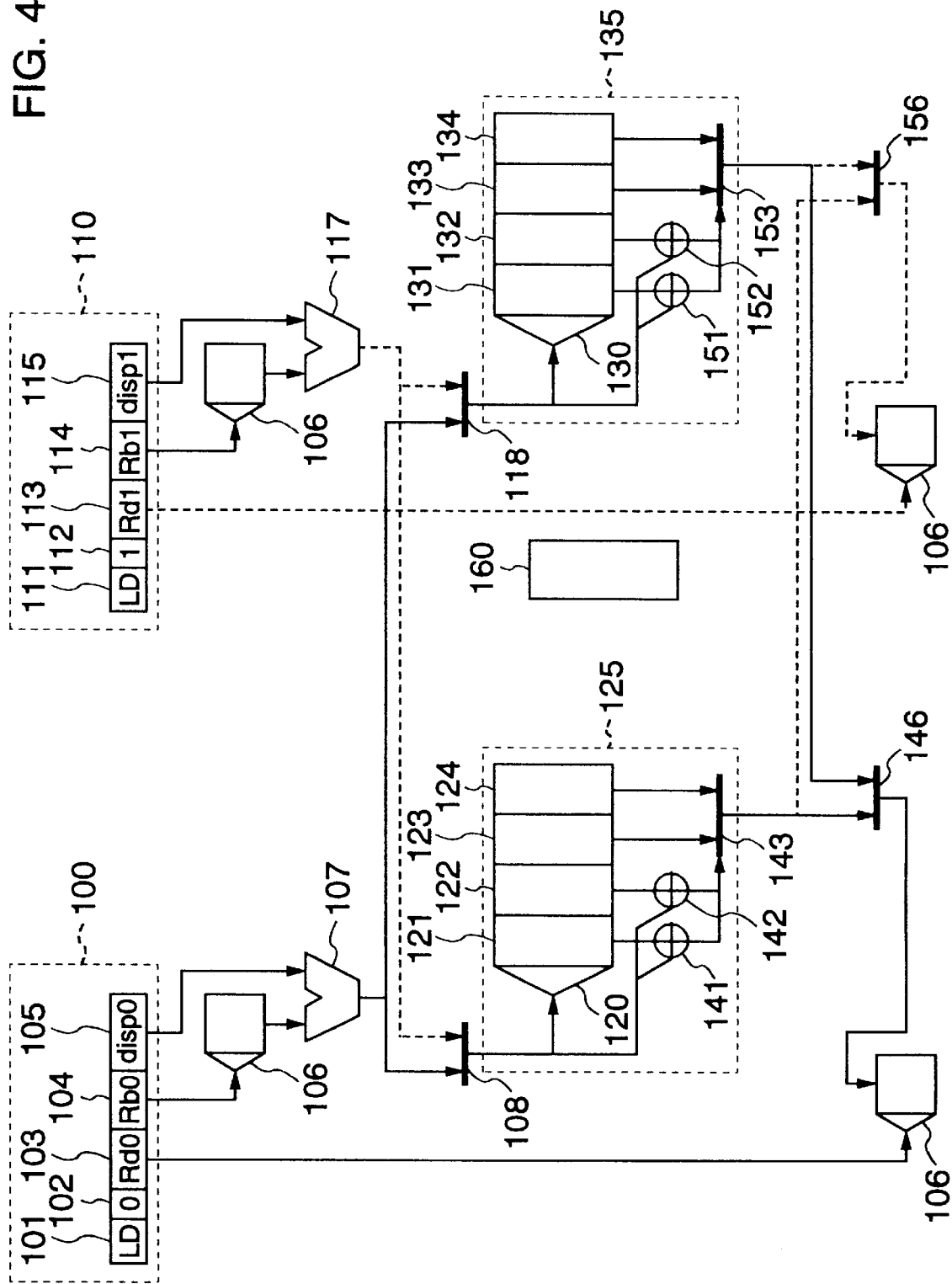
FIG. 4 is a diagram showing operation to process one memory access in the cache memory shown in FIG. 1.

FIG. 4 shows an operation of executing a Load instruction set to the instruction register 100. Both of the input address selector 108 of the memory bank 0 and the input address selector 118 of the memory bank 1 select the memory port 0 side, i.e., an access address of the Load instruction set to the instruction register 100. Using the address, a search is conducted simultaneously for the memory banks 0 (125) and 1 (135) which configure a cache memory of a the two-way set-associative type. When an address hit occurs in either one of the memory banks, the corresponding data is outputted from the selector 143 or 153. The data is then delivered via the selector 146 as read data from the memory port 0 side of the data cache 430 to thereby terminate the access on the memory port 0 side. When an address miss occurs in both memory banks, the operation of the first cycle is interrupted at the point and then the control circuit 160 determines that the main memory 440 is accessed in the second cycle.

As above, when only one memory access instruction is executed, the cache can operate as a cache memory conducting the four-way set-associative operation in one cycle.

Description has been given up to this point mainly of a case in which a hit occurs in the memory bank 0 (125) or 1 (135) in the memory access operation. Next, description will be given of a case in which a miss occurs in both of the memory banks 0 (125) and 1 (135) in the memory access operation.

As a result of operation of FIG. 3, for the access address on the memory port 0 side, namely, for the access address of the Load instruction set to the instruction register 100, when a miss results in both of the memory banks 0 (125) and 1 (135), the main memory 440 is accessed in the third cycle. Data read from the main memory 440 is transferred to the processor 410 to be stored in the register file 106. In this situation, since the data is likely to be again accessed in near future, the data is also stored in the data cache 430. One of the memory banks of the data cache 430 is selected as the storage in accordance with the memory port related to the access. In this case, since the access is made by the instruction on the memory port 0 side, namely, the instruction set to the instruction register 100, the data is stored in the memory bank 0 (125). One of the ways of the memory bank 0 (125) is determined, for example, as follows. Namely, the way accessed at the earliest time is selected for the storage this is called an LRU algorithm.

Similarly, as a result of operation of FIG. 3, for the access address on the memory port 1 side, namely, the access address of the Load instruction set to the instruction register 110, when a miss occurs in both of the memory banks 0 (125) and 1 (135), the main memory 440 is accessed in one of the third and subsequent cycles. Whether the main memory 440 is to be immediately accessed in the third cycle or thereafter is determined in accordance with the state of the miss on the memory port 0 side. That is, when the main memory 440 is accessed with the miss also on the memory port 0 side, the processing on the memory port 0 side is conducted in the third cycle and the processing on the memory port 1 side is carried out after the third cycle.

Data read from the main memory 440 is, like in the case of the access via the memory port 0 side, transferred to the processor 410 to be stored in the register file 106. In this situation, since the data is likely to be again accessed in near future, the data is also stored in the data cache 430. One of the memory banks of the data cache 430 is selected as the storage in accordance with the memory port related to the access. In this case, since the access is made by the instruction on the memory port 1 side, namely, the instruction set to the instruction register 110, the data is stored in the memory bank 1 (135). One of the ways of the memory bank 1 (135) is determined, for example, in accordance with the LRU algorithm.

When only one memory access is processed during one cycle, a search is simultaneously made for both of the memory banks 125 and 135 to determine the hit or miss as shown in FIG. 4. When the miss results in both of the memory banks 125 and 135, the main memory 440 is accessed in the second cycle. Data read from the main memory 440 is transferred to the processor 410 to be stored in the register file 106. In this situation, since the data is likely to be again accessed in near future, the data is also stored in the data cache 430. One of the memory banks of the data cache 430 is selected as the storage in accordance with the memory port related to the access. In the case of FIG. 4, since the access is made by the instruction on the memory port 0 side, namely, the instruction set to the instruction register 100, the data is stored in the memory bank 0 (125). One of the ways of the memory bank 0 (125) is determined, for example, in accordance with the LRU algorithm.

Moreover, there may be employed another control procedure in which two ways of the memory bank 0 (125) and two ways of the memory bank 1 (135) are equally treated, i.e., these ways are regarded as a total a four-way set-associative configuration and one of the ways is selected to store data therein. In this case, it is also possible to use the LRU algorithm in which the way accessed at the oldest time are selected from the ways for the storage of data.

Figure 6:
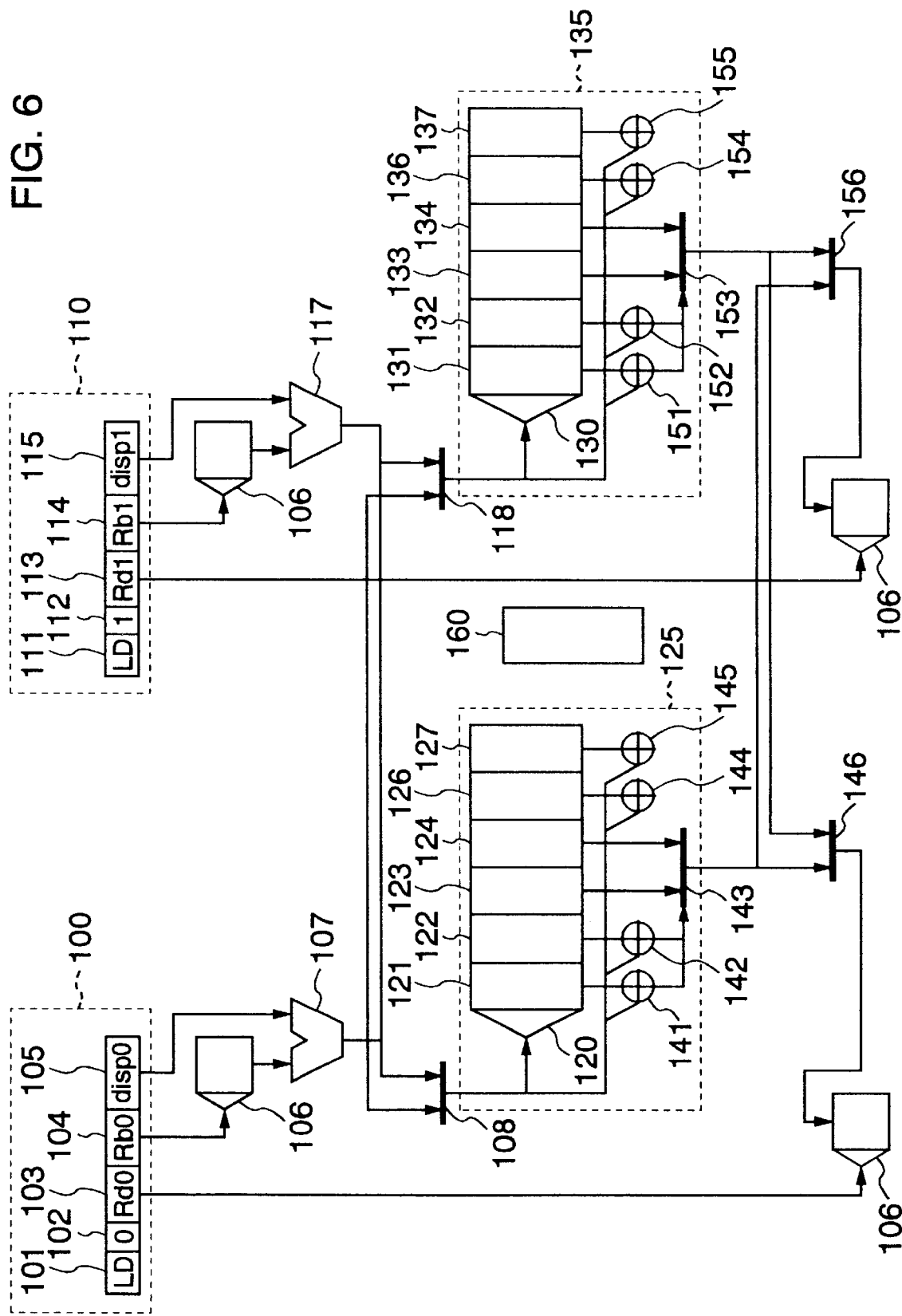
FIG. 6 is a block diagram showing a cache memory and a peripheral block thereof in another embodiment in accordance with the present invention.

In the configuration of FIG. 1 described above, when the miss occurs in both of the memory banks 125 and 135, two cycles are required to detect the condition. By additionally disposing a few hardware items, the case in which the miss occurs in both of the memory banks 125 and 135 can be detected in one cycle. FIG. 6 shows a block diagram of the configuration.

In FIG. 6, the memory bank 0 (125) includes copies 126 and 127 respectively of address tag memory arrays 131 and 132 of the memory bank 1 (135); moreover, in addition to the configuration of FIG. 1, there are arranged comparators 144 and 145 to compare tags read from the memory arrays 126 and 127 with high-order bits of the address selected by the selector 108. Consequently, in concurrence with the cycle In which the address search is being achieved for the memory bank 0 (125), the address search can be carried out for the memory bank 1 (135). Even if the miss occurs for both of the memory banks, it Is possible to detect the condition in one cycle. Therefore, the access to the main memory 440 can be initiated without accessing the memory bank 1 (135) in the second cycle, and hence the processing at the miss of the data cache 430 can be conducted at a higher speed.

Similarly, on the side of memory bank 0 (125), there are disposed copies 136 and 137 respectively of address tag memory arrays 121 and 122 of the memory bank 0 (125), and in addition to the configuration of FIG. 1, there are arranged comparators 154 and 155 to compare tags read from the memory arrays 136 and 137 with high-order bits of the address selected by the selector 118. Consequently, in concurrence with the cycle in which the address search is being achieved for the memory bank 1 (135), the address search can be carried out for the memory bank 0 (125). Therefore, even if the miss occurs for both of the memory banks, it is possible to detect the condition in one cycle. In consequence, the access to the main memory 440 can be initiated without accessing the memory bank 0 (125) in one of the second and subsequent cycles, and hence the processing at the miss of the data cache 430 can be conducted at a higher speed.

In accordance with the embodiment as described above, since the miss in both memory banks 125 and 135 can be determined in one cycle, the processing speed at the miss of the data cache 430 is advantageously increased.

In relation to the description, although the embodiment includes two memory banks and two memory ports, the present invention is not restricted by the embodiment.

Within a scope of the present invention, there may be constructed an embodiment including three or more main banks and three or more memory ports.

For example, the scope of the present invention includes an embodiment including four main banks and four more memory ports. In this case, the first to fourth memory access ports respectively access the first to fourth memory banks in the first cycle, and the ports access the other banks in the second and subsequent cycles. For example, in the second cycle, the first to fourth memory access ports respectively access the second, third, fourth, and first memory banks. In the third cycle, the first to fourth memory access ports respectively access the third, fourth, first, and second memory banks. In the fourth cycle, the first to fourth memory access ports respectively access the fourth, first, second, and third memory banks.

In addition, there may be provided in the scope of the present invention an embodiment including four memory banks and two memory ports. In this case, the first memory access port accesses the first and second memory banks and the second memory access port accesses the third and fourth memory banks. In the second and subsequent cycles, the ports respectively access the different memory banks. For example, in the second cycle, the first memory access port accesses the third and fourth memory banks and the second memory access port accesses the first and second memory banks.

As described above, any cases including two or more memory banks and two or more memory ports are within the scope of the present invention.

The following advantages can be obtained in accordance with the present invention described above.

First, the memory is subdivided into a plurality of memory banks to conduct a concurrent operation and hence there can be implemented a function of a multi-port memory capable of simultaneously processing a plurality of memory accesses.

Additionally, when a memory bank accessed in the first cycle has an address to be accessed, it is possible to concurrently process a plurality of memory accesses in one cycle.

As a result, since a plurality of memory accesses can be concurrently processed in one cycle if an address to be accessed remains in a memory bank accessed in the first cycle, there can be implemented a function of a multi-port memory. For example, in a case in which there are provided two memory banks, a function of a dual-port memory can be provided without minimizing the memory cell access time to half the original time; conversely, without doubling the total cycle time.

Furthermore, since the memory bank selection is accomplished without using addresses, the selection by the address input selectors can be concurrently executed with other processing, namely, the selection time does not lead to a critical path. Therefore, the multi-port function can be materialized without elongating the memory access time.

INDUSTRIAL APPLICABILITY

As above, the multi-port memory in accordance with the present invention can be implemented without increasing the memory access time and therefore is suitable for a memory, particularly, for a cache memory of a data processor such as a super-scalar processor and a VLIW processor in which a plurality of memory accesses are required to be processed in one cycle.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A multi-port cache memory comprising:
   a plurality of memory banks, each of which stores plural data and addresses in pairs;
   determining means for determining whether an address corresponding to an address inputted from an external device is stored in the memory bank;
   means for accessing and outputting data paired with the address corresponding to the address inputted from the external device;
   plural memory ports, each having an address input port and a data output port;
   first means for selecting each of a plurality of addresses inputted from address input ports and inputting the selected address to either one of the plural memory banks; and
   means for outputting data read from each of the memory banks to a data output port corresponding to the address input port from which the address inputted to the memory bank is supplied.

2. A multi-port memory in accordance with claim 1, wherein:
   the first means inputs, in a first cycle, a first address supplied from a first memory port of the plural memory ports to a first memory bank of the plural memory banks and a second address supplied from a second memory port of the plural memory ports to a second memory bank of the plural memory banks;

the first means inputs, when the determining means of the first memory bank determines absence of data to be paired with the first address, the first address to the second memory bank in a cycle after the first cycle; and the first means inputs, when the determining means of the second memory bank determines absence of data to be paired with the second address, the second address to the first memory bank in a cycle after the first cycle.

3. A data processor connected for use to the multi-port memory serving as a data memory in accordance with claim 2, comprising:

means for decoding information of a predetermined number of bits arranged in an instruction of accessing the data memory; and means for executing the instruction in accordance with a result of the decoding in which the information is used for specifying one of the plural memory ports to be accessed.

4. A multi-port memory in accordance with claim 1, wherein:

the first means inputs, in a first cycle, a first address supplied from a first memory port of the plural memory ports to all memory banks of the plural memory banks.

5. A data processor connected for use to the multi-port memory serving as a data memory in accordance with claim 1 comprising:

means for decoding information of a predetermined number of bits arranged in an instruction of accessing the data memory; and means for executing the instruction in accordance with a result of the decoding, wherein the information is used for specifying one of the plural memory ports to be accessed.

6. A multi-port cache memory located between a processor and a main memory for temporally storing plural copies of data stored in the main memory, and for receiving an address from the processor and sending a copy of data designated by the address if such a copy exists therein, said multi-port cache memory comprising:

a plurality of memory banks, each of which has address storage portions for storing plural partial addresses and data storage portions for storing plurality of copies, wherein a partial address includes a part of bits of an address issued by an instruction register of the processor, and a pair of a partial address and a copy is retrieved by using other part of bits of the processor issuing address;

a first selector for receiving a plurality of addresses from plural instruction registers of the processor and, respectively directing the received addresses to the memory banks to select a pair of a partial address and a copy, wherein each instruction register also designates a destination register in a register file;

each of the memory banks having a comparator for comparing a partial address read-out therefrom with a part of address bits of the processor issuing address, the memory bank outputting a copy as its output if coincidence is detected, wherein the address bits are selected from the same bit locations of the partial address; and a second selector for receiving a plurality of copies outputted from each of the memory banks and, respectively outputting the received copies in connection with designation registers specified with the plural instruction registers.

7. A computer system, comprising:

a host processor;

a main memory arranged to store programs and data; and a multi-port data cache arranged to accommodate one or more memory access operations concurrently from said host processor so as to prevent access collision, said multi-port data cache comprising:

a plurality of memory banks each of which stores plural data and addresses in pairs, and each of which has a memory port indicating an address input port and a data output port;

first selector means arranged to receive a plurality of addresses from said host processor, and respectively direct the addresses to said memory banks; and second selector means arranged to receive a plurality of copies of data outputted from each of said memory banks, and respectively produce the copies of data to said host processor as designated by the addresses to said memory banks.

8. A computer system in accordance with claim 7, wherein each of said memory banks contains a comparator arranged to compare a partial address read-out therefrom with a part of the address issued from said host processor, and produce a copy of data if the partial address read-out corresponds to the address issued form said host processor.

9. A computer system in accordance with claim 7, wherein all of said memory banks can be accessed concurrently by said host processor during a single cycle.

10. A computer system in accordance with claim 7, wherein said host processor comprises a plurality of register files arranged to store data and instructions for memory access operations; and an arithmetic logic unit (ALU) arranged to execute instructions for specifying a selected memory port of said memory banks to be accessed.

* * * * *